Feb. 26, 1957 — F. H. RICHMAN — 2,782,956
INSULATED DRUM
Filed Oct. 28, 1954 — 2 Sheets-Sheet 2
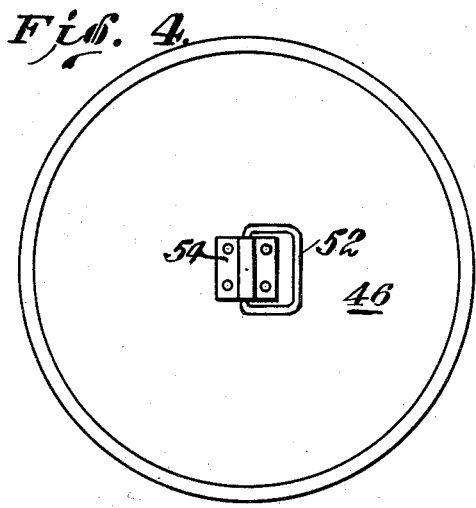
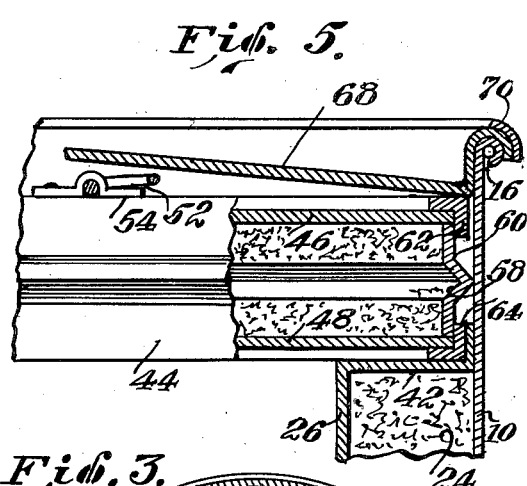
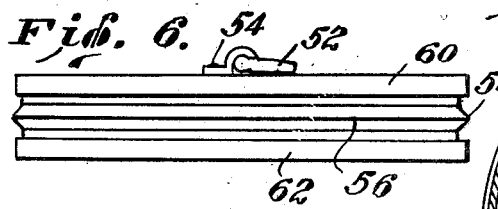
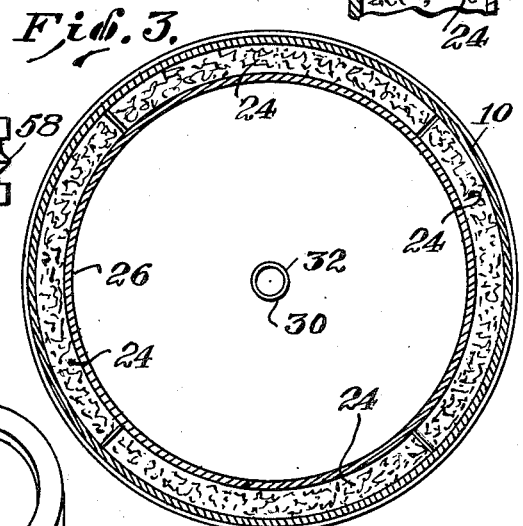
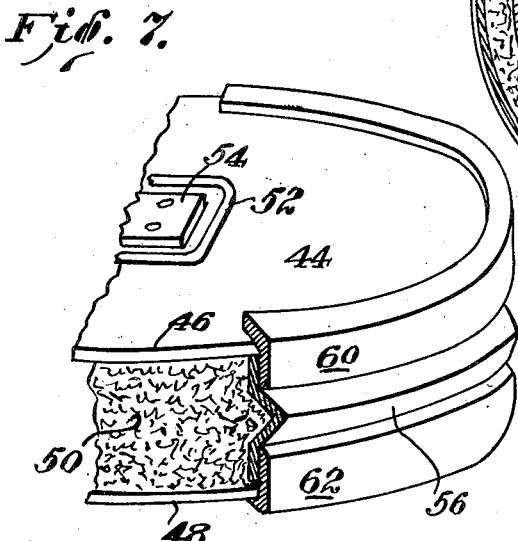
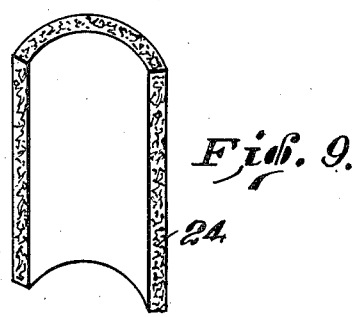
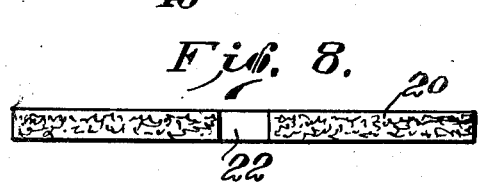
INVENTOR.
FREDERICK H. RICHMAN.
Attorney

United States Patent Office 2,782,956
Patented Feb. 26, 1957

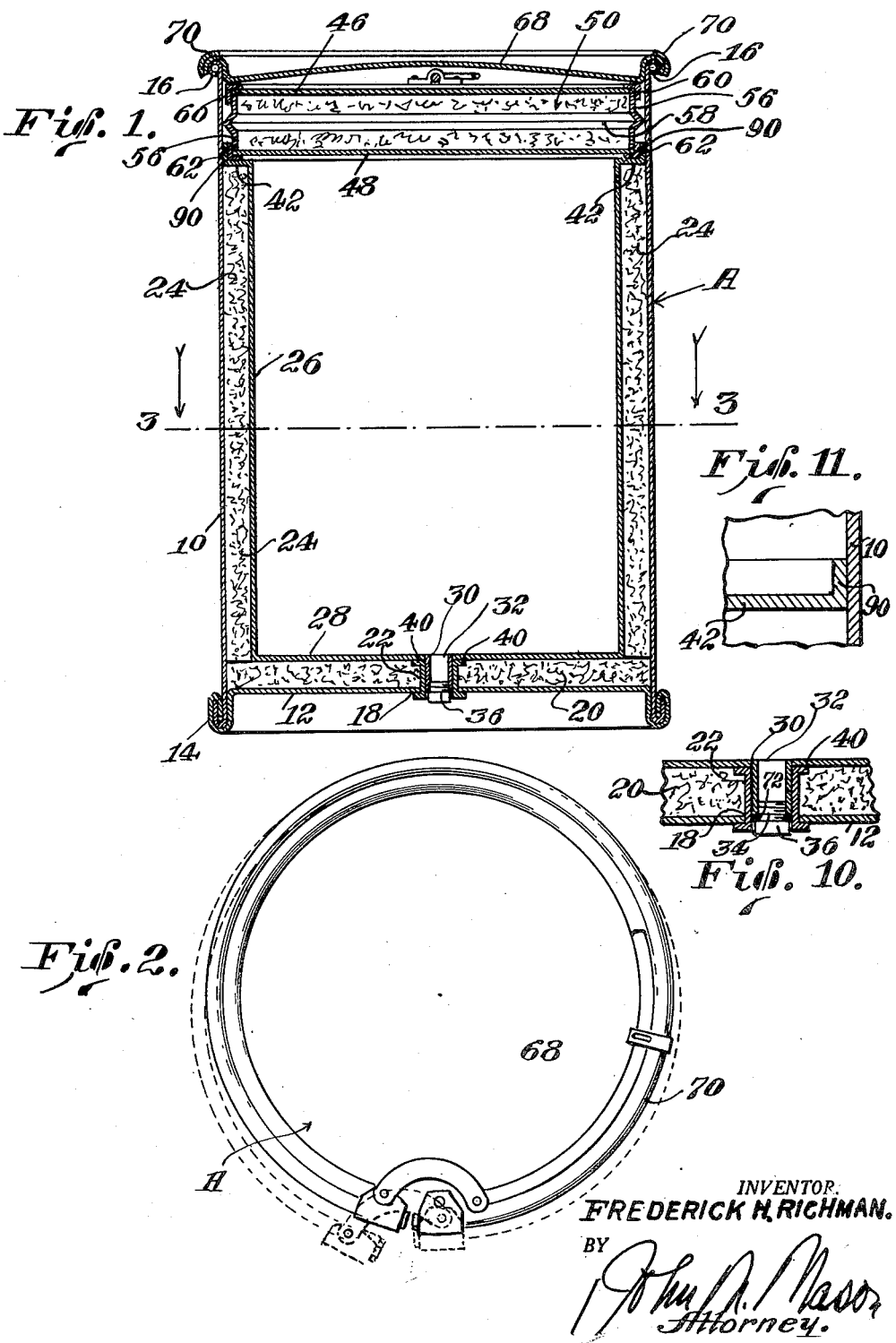

2,782,956
INSULATED DRUM
Frederick H. Richman, Pensacola, Fla.
Application October 28, 1954, Serial No. 465,193
2 Claims. (Cl. 220—10)

This invention relates to a drum or other circular container for the shipment of fish and other refrigerated products.

An object of the invention is to provide an insulated metallic container for fish products and other perishable food products which is sturdy and is composed of a minimum of parts.

Another object is to provide an insulated double-walled drum, the parts of which may be assembled without tools, from pre-formed component parts.

A further object is to provide a plurality of pre-formed parts which, when combined with a standard steel drum, may be assembled to form a heat-insulated leak-proof drum for the shipment of perishable food products.

Another important object is to provide a drum, all parts of which are held to the outside casing in such manner that the liner, insulation, and covers may readily be replaced, these parts being easily removable from the outside casing.

Other objects will appear hereinafter throughout the specification.

In the drawings:

Figure 1 shows a transverse vertical sectional view of the drum of this invention;

Figure 2 is a top plan view of the drum shown in Figure 1;

Figure 3 is a horizontal sectional view taken on the line 3—3 of Figure 1;

Figure 4 is a top plan view of the inside cover;

Figure 5 is a broken-away enlarged detail of the upper right side of the container and cover, with parts shown in vertical section;

Figure 6 is a side elevation of the inside cover shown in Figure 4;

Figure 7 is a perspective view with parts broken away, or shown in section, of the inside cover;

Figure 8 is a vertical transverse section through the center of the lower insulating lining;

Figure 9 is a perspective view of one of the parts of the circular lining;

Figure 10 is an enlarged vertical sectional view partly broken away of the drain opening and parts mounting the same; and Figure 11 is an enlarged detail vertical sectional view of a part of the outer side wall and its connection with the liner or inner wall.

Referring to the drawings, the drum as a whole is indicated by the letter A.

The drum comprises an outside metal casing 10, which casing is preferably that of a standard 58 gallon, 18 gauge, open-head shipping container, although other types and sizes of containers may be used.

The casing 10 includes a base 12 that is sealingly connected to the cylindrical sides at 14, as shown in Figure 1, and an upper spun-over rim 16. The base has a centrally located aperture 18. Except for the aperture, the foregoing parts are those of a standard shipping container of the type now in use for shipping comestibles and other perishable foods.

The present invention utilizes this drum as the outside casing of a double-walled container or drum having insulation in the space between the cylindrical and base walls of the said outside casing.

As shown in Figures 1, 3, 5, and 10, a circular molded insulating disk 20 having a central aperture 22 as shown in Figure 8, preferably composed of styrofoam because of its good insulating qualities and further, because it may readily be molded to proper shape, is dropped into the casing 10. In this position, the apertures 18 and 22 are in alignment.

A plurality of styrofoam quarter cylindrical segments 24, as shown in Figures 9 and 3, are then inserted within the casing to form the cylindrical side wall insulation.

The liner 26, preferably of about 26 gauge galvanized steel, is next inserted into the drum so as to snugly fit against the styrofoam disk 20 and segments 24. The liner has a bottom portion 28 provided with a central aperture 30, into which is fixed, preferably by a press fit or by soldering, a pipe 32 that extends through aperture 22, and whose lower end is internally screw-threaded at 34. The end of the pipe is closed by a screw-threaded plug 36 provided with the usual washer 72.

A sleeve 38 surrounds the pipe 32, and is preferably attached to the base 12 by any suitable means, such as by solder. The sleeve has flanges 40 that assist in maintaining the base and bottom portion 12 and 28 respectively in spaced relationship. The upper open end of the liner is provided with a circular outwardly extending flange 42 which preferably forms a press fit with the inner cylindrical surface of the casing 10 and collar 90.

The upper end of the liner is sealed by the inside cover 44. This consists of upper and lower disks 46 and 48 respectively, and intermediate insulating disk 50, preferably of styrofoam material. A pivoted handle 52 is attached to the upper disk by a plate 54.

The disks 46 and 48 are held in separated relationship by the cylindrical spacer member 56, having a corrugated intermediate portion 58 that fits against the inside of the outside casing 10 when the cover 44 is in position as shown in Figure 5.

The parts of the inside cover member are held together by the ring members 60 and 62 which are angle shaped in cross section and which hold the cylindrical spacer member 56 to the upper and lower disks 46 and 48, respectively.

The inside cover 44 is clampingly held against the flange 42 of the liner by the head drum steel cover 68, and covers 68 and 44 are locked in sealed relationship to the liner by the clamping ring 70 as shown in Figure 2, which latter is of standard construction.

It will be noted that the cover 68 is of dish shape, so as to provide clearance for the handle 52 as shown in Figures 1 and 5.

The plug 36 may be removed to allow for drainage of fluids from the liner 26.

The liner, insulation, and covers may be readily replaced. The parts of the inside cover are held together by a press fit. With both covers removed, the liner and the insulation may easily be taken out for cleaning or replacement, by pulling the liner 26 which only has a frictional engagement with the outside casing 10 by means of the flange 42. The pipe 32 with its plug or stopper 36 may readily be slid out of the sleeve 38. The disk 20 can then be removed, followed by the removal of the quarter segments of styrofoam insulation. These parts or replacement parts may then be re-inserted into the casing 10 without the necessity of using tools for this purpose.

It will be appreciated that the drum of this invention may be quickly assembled without tools. It will keep comestibles and other perishable foodstuffs in good condition for long periods of time, depending in extent upon whether ice or dry ice is used as the cooling means, and on outside temperatures.

The new construction insures an exceptionally good food preservative container, and one having ends which are strongly reinforced by the several layers of metal.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A drum composed of an outside casing including a cylindrical side and a base, the bottom of said side being joined to the outer periphery of said base, a liner in said casing having a bottom portion, a disk of insulating material located between said bottom portion and base, said liner having a cylindrical side and insulating material between said cylindrical sides of said casing and liner, an inner cover having insulating material therein and an outer cover disposed over and in engaging relationship with said inner cover, said inner cover further including upper and lower disks and means connecting said disks with said insulating material between them, said last-named means comprising a cylindrical spacer member, said member having an annular rib projecting outwardly between said discs, said rib fitting against the inner surface of said casing in closed position.

2. A drum composed of an outside casing including a cylindrical side and a base, the bottom of said side being joined to the outer periphery of said base, a liner in said casing having a bottom portion, a disk of insulating material located between said bottom portion and base, said liner having a cylindrical side and insulating material between said cylindrical sides of said casing and liner, an inner cover having insulating material therein and an outer cover disposed over and in engaging relationship with said inner cover, said inner cover further including upper and lower disks and means connecting said disks with said insulating material between them, said member having an annular rib projecting outwardly between said discs, said rib fitting against the inner surface of said casing in closed position, and a clamping ring adapted to be in locking engagement with said outer cover in closed position.

References Cited in the file of this patent

UNITED STATES PATENTS

| | | |
|---|---|---|
| 186,899 | Tober | Jan. 30, 1877 |
| 601,845 | Smith | Apr. 5, 1898 |
| 608,684 | Kahn | Aug. 9, 1898 |
| 876,858 | Clingen | Jan. 14, 1908 |
| 970,095 | McPheeters | Sept. 13, 1910 |
| 2,010,812 | Devine | Aug. 13, 1935 |
| 2,076,821 | Lipman | Apr. 13, 1937 |
| 2,080,923 | Lassen | May 18, 1937 |
| 2,114,686 | Roberts et al. | Apr. 19, 1938 |
| 2,147,886 | Devine | Feb. 21, 1939 |
| 2,152,634 | Cornell | Apr. 4, 1939 |
| 2,239,512 | West | Apr. 22, 1941 |
| 2,301,657 | Hlavaty | Nov. 10, 1942 |
| 2,341,740 | Penney | Feb. 15, 1944 |
| 2,484,608 | Cheyney et al. | Oct. 11, 1949 |
| 2,523,145 | Robinson | Sept. 19, 1950 |
| 2,552,641 | Morrison | May 15, 1951 |

FOREIGN PATENTS

| | | |
|---|---|---|
| 272,353 | Switzerland | Mar. 1, 1951 |